US010743712B2

(12) United States Patent
Skillman

(10) Patent No.: US 10,743,712 B2
(45) Date of Patent: Aug. 18, 2020

(54) FOLDING FIRE PIT

(71) Applicant: Ohio Flame, Inc., Columbiana, OH (US)

(72) Inventor: Matthew Skillman, Boardman, OH (US)

(*) Notice: Subject to any disclaimer, the term of this patent is extended or adjusted under 35 U.S.C. 154(b) by 167 days.

(21) Appl. No.: 15/899,924

(22) Filed: Feb. 20, 2018

(65) Prior Publication Data

US 2019/0254477 A1 Aug. 22, 2019

(51) Int. Cl.
*A47J 37/07* (2006.01)
(52) U.S. Cl.
CPC .... *A47J 37/0763* (2013.01); *A47J 2037/0777* (2013.01)
(58) Field of Classification Search
CPC .................................................. A47J 37/0763
USPC .......................... 126/9 R, 544, 151, 29, 25 R
See application file for complete search history.

(56) References Cited

U.S. PATENT DOCUMENTS

| 3,109,420 | A | 11/1963 | Ott | |
| 4,211,206 | A * | 7/1980 | Darbo | A47J 37/0763 126/25 R |
| 5,785,046 | A | 7/1998 | Colla | |
| 9,808,116 | B1 * | 11/2017 | Mummert | A47J 33/00 |
| 10,201,233 | B2 * | 2/2019 | Grisham | A47C 9/10 |
| 2012/0204852 | A1 * | 8/2012 | Boucher | A47J 37/0763 126/30 |
| 2012/0222668 | A1 | 9/2012 | Unger | |
| 2013/0298893 | A1 | 11/2013 | Linville | |

OTHER PUBLICATIONS

Snow Peak Large Fire Pit—Drifta Camping & 4WD, https://www.drifta.com.au/product/large-pack-and-carry-fire-pit/, accessed Nov. 3, 2017, published Sep. 17, 2016.
X Grill Portable Bbq—Contemporary—Outdoor Grills—by Picnic Time, https://www.houzz.com/product/86002806-x-grill-portable-bbq-contemporary-outdoor-grills, accessed Nov. 3, 2017.

* cited by examiner

*Primary Examiner* — Avinash A Savani
(74) *Attorney, Agent, or Firm* — Emerson, Thomson & Bennett, LLC; Roger D. Emerson

(57) ABSTRACT

A folding fire pit is able to be easily assembled and disassembled for transportation and storage purposes. The folding fire pit design is primarily comprised of four sidewalls and a covering grate. Each of the series of four sidewalls have a collapsible relation to one another and are positioned so as to create an enclosure therebetween. A series of securement tabs and corresponding receiver slots are present on the various sidewalls so as to create a secured connection between the various structures. The covering grate may further be secured to the outer most edge of each of the four sidewalls by way of a series of securement tabs and corresponding receiver slots.

20 Claims, 3 Drawing Sheets

FOLDING FIRE PIT

TECHNICAL FIELD

This invention relates generally to fire pits, and more particularly to a folding fire pit design which is capable of being collapsed or otherwise disassembled in order to create a more portable device for transportation and storage.

BACKGROUND

Many people enjoy an open, outdoor fire, such as at a campground. In many situations, however, it is necessary or desirable to provide good protection against the fire from spreading. One commonly known method of controlling a fire is by way of using a fire ring or fire pit. Most conventional fire rings often consist of a simple ring or hoop of metal placed upon the ground to allow combustible material, such as wood or charcoal, to be placed in the middle of the ring. While this type of device is useful in certain circumstances and under certain conditions, it also has many associated drawbacks.

As an alternative to the simple fire ring, one can build a fire pit with substantially upright sides to provide the kind of protection that might be desirable for a wider variety of uses, such as in proximity to a home. In such a construction, the fire pit typically includes metal screens or grates located in the sides to provide protection against the fire spreading, while still allowing people to enjoy seeing the fire through the screens.

Unfortunately, fire pit designs are often times quite large and bulky, thus making it difficult to transport such a unit from place to place, while also taking up a large amount of space when in storage. As a response to this, portable fire pit constructions have been contemplated. Such portable fire pit designs are often made from iron, steel, aluminum, ceramic, or other fireproof materials and are widely used for outdoor fire containment on lawns, on patios, on decks, in backyards, on beaches, and generally anywhere it is desired to enjoy an open fire without marring the landscape or platform upon which the fire is being built. Fire pits can also reduce the worry associated with having an uncontained fire in such locations.

While it is known to make campfire "rings" collapsible for portability or shipping, their light weight and flexible nature tends to result in units which are not very durable or long-lasting, and they further lack a bottom plate for lawn and patio use. Heavier-duty fire pits with substantial bottom plates or bowls are suitable for long-term lawn and patio use, but are not made to be packed flat for shipping, and they can be difficult to assemble, often times requiring tools and special fasteners.

As such, a need exists for a fire pit design which can provide good protection against the spread of a fire, is easily assembled and disassembled by a single user, can be easily transported from place to place, and which is capable of being made compact for storage or transport.

SUMMARY

A folding fire pit design which may be configured according to either of two different arrangements: assembled and disassembled. According to the disassembled arrangement, the fire pit is able to be completely portable such that it may be easily transported, such as in a backpack or other small carrying case. According to the assembled configuration, the fire pit is able to be used for all general purposes typically associated with that of a traditional, stationary fire pit.

When in the assembled configuration, a series of interlocking tabs are used so as to securely affix the various sides of the fire pit to one another, creating a stable unit capable of housing a fire. By disassembling the fire pit, the unit is able to be stored and transported with much greater ease as opposed to that of a traditional, stationary fire pit. The fire pit may be disassembled such that the unit is extremely compact, to the point where it may be stored or transported on the person of a mobile individual, such as in a backpack or other similar carrying device. By creating a unit with this degree of compactness and portability, the fire pit is further able to be stored and transported with relative ease (such as by being stored in virtually any camper or the trunk of a vehicle).

The fire pit is generally defined by having 5 sides: four side walls and a top, or covering grate. For example, the configuration of the side walls may be such that the enclosure is substantially square, rectangular, trapezoidal, or of any other geometric shape, so long as the various side walls are used so as to create the type of enclosure contemplated above. The covering grate may then rest upon the top edge of each of the various four sidewalls, thus laying across the top most portion of the enclosure.

Each of the four side walls may be fitted with some variation of an interlocking tab system (either the tab itself, or the corresponding receiver slot into which the tab may be inserted) such that the various sides may be connected to one another. The assembled configuration of the fire pit may be defined as when the interlocking tabs are securely placed into the corresponding receiver slots located on another of the side walls. When in the assembled configuration, these interlocking tabs create a secure attachment between the various sides of the unit.

The side walls of the fire pit may be further equipped with handles or handle-like fixtures such that the unit is able to be easily transported between locations. For example, when the fire pit is in the disassembled configuration, the unit may be conveniently stacked upon itself or otherwise arranged so as to carry the entire unit by the various handle fixtures.

BRIEF DESCRIPTION OF THE DRAWINGS

The accompanying drawings in the following description illustrate various embodiments of the present disclosure.

DETAILED DESCRIPTION

Figure 1:
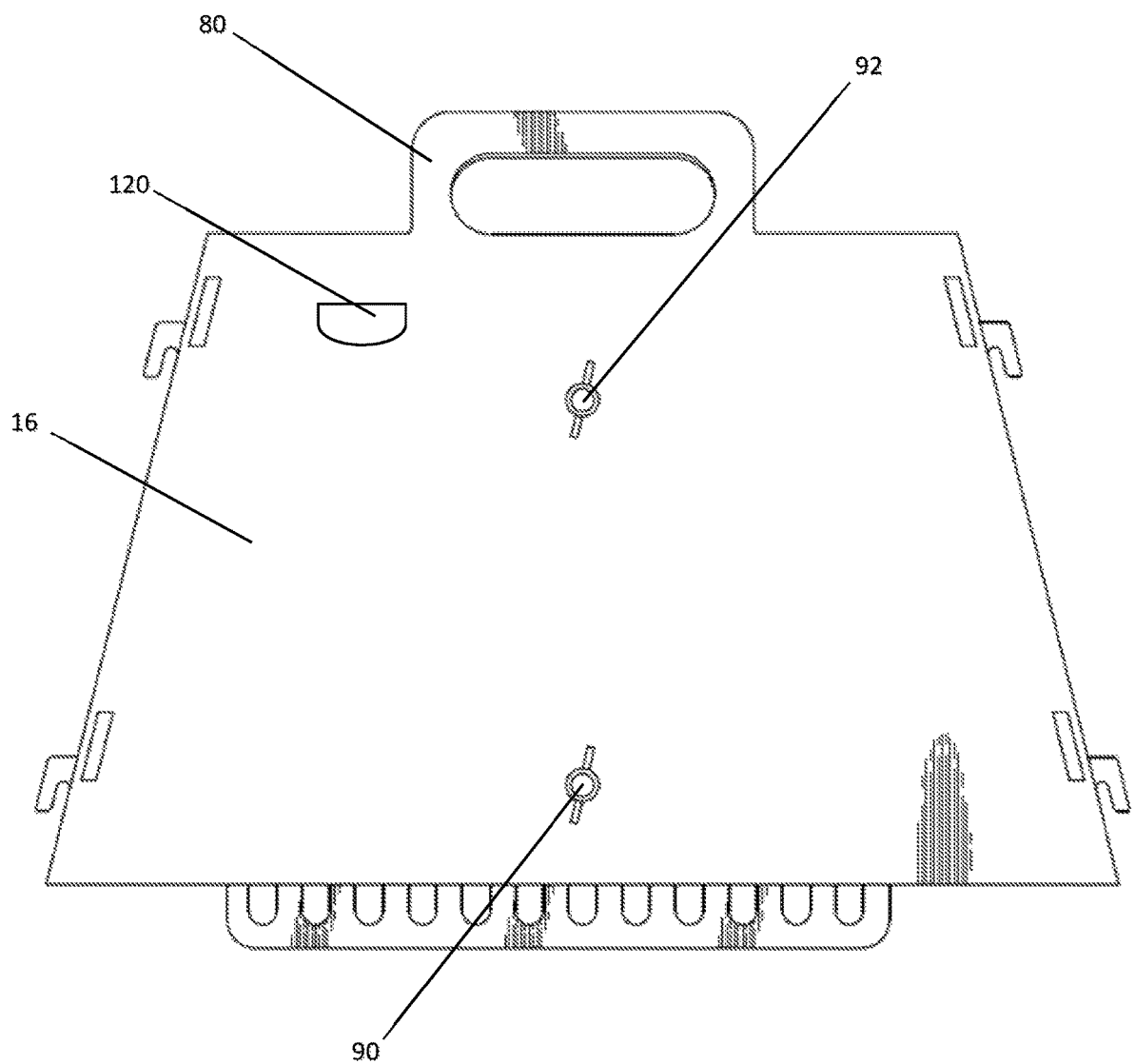
FIG. 1 is a front view of the third sidewall of the folding fire pit design when in the disassembled configuration and ready for transport/storage.

With reference to FIG. 1, a folding fire pit is shown in the disassembled configuration. The folding fire pit is generally defined by a series of components which are arranged so as to create an enclosure in which a fire may be housed. The folding fire pit is comprised of five sides which act to form such an enclosure. Each of the five sides may be constructed of a fireproof or flame retardant material which is capable of housing and containing a fire, such as iron, aluminum, steel, stainless steel, or any other material which is known by those having skill in the art as being a viable material of construction for fire pit designs.

With reference to FIG. 1, the folding fire pit design consists of a series of sidewalls. For example, when utilizing a square, rectangular, or trapezoidal design, four sidewalls will be present in order to create an enclosure for which to house a fire. If a different shape or configuration is desired, then the number of corresponding sidewalls may be varied accordingly. According to the embodiment shown in FIGS. 1, 2, and 3, the sidewalls of the folding fire pit design are of a trapezoidal nature. When utilizing such a shape for the sidewalls, the folding fire pit design is given a lower center of gravity, thus directing the weight of the unit diagonally, as opposed to directly downward, thereby decreasing the ability of the sidewalls to deform or otherwise skew in an unwanted direction.

Figure 2:
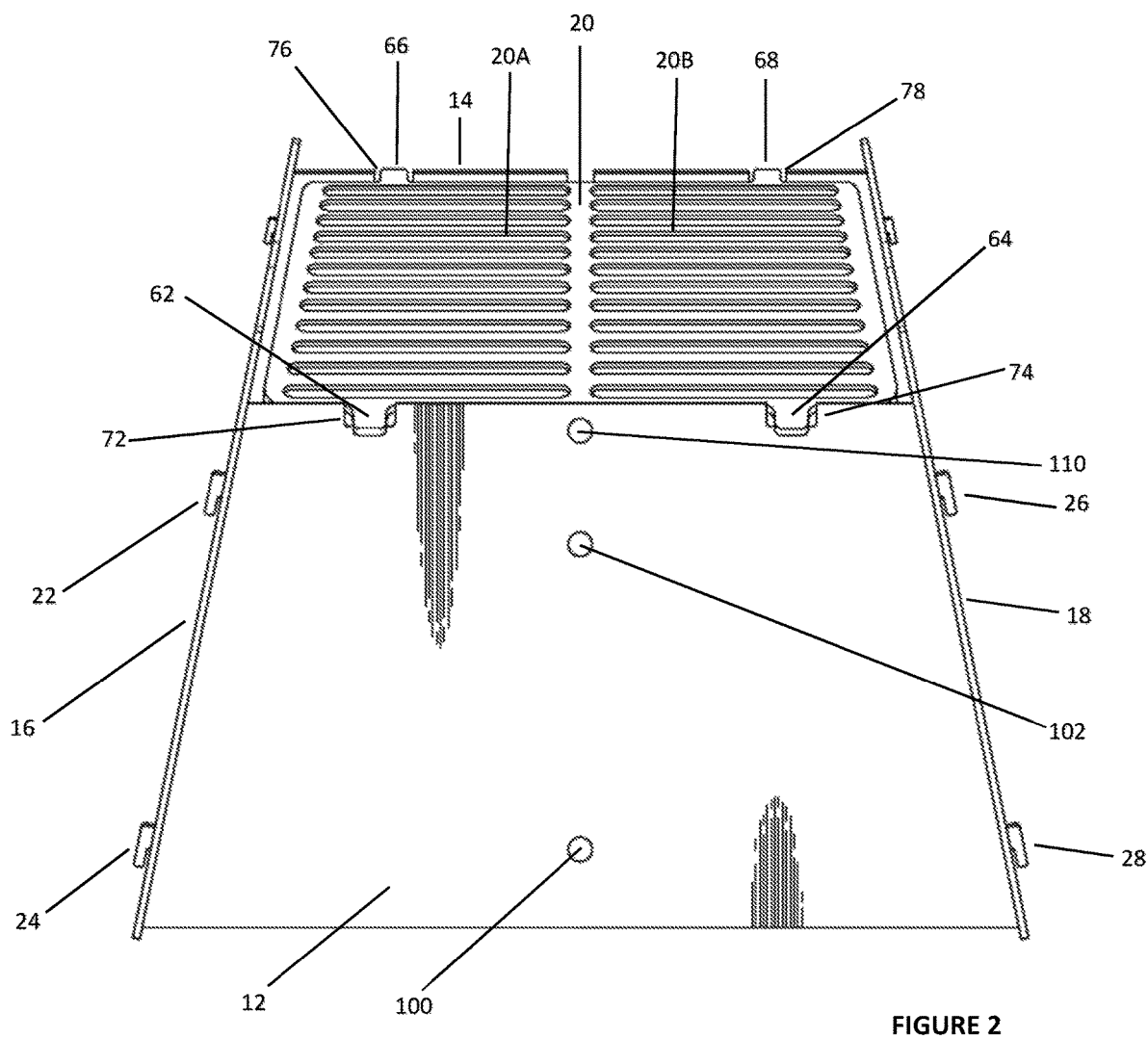
FIG. 2 is a front view of the folding fire pit design when in the assembled configuration from the perspective of either the first or second sidewall.

With reference now to FIGS. 1 and 2, a series of four sidewalls are erected in an upright fashion so as to create an enclosure for housing a fire: a first sidewall 12, a second sidewall 14, a third sidewall 16, and a fourth sidewall 18. Each of the four sidewalls are of a generally trapezoidal shape, with the lower, bottom edge measuring slightly longer in length than that of the opposing top edge. Each of the four sidewalls may be better understood by their special relation to one another. The first sidewall 12 and the second sidewall 14 are positioned upright such that they run substantially parallel to one another. The third sidewall 16 and the fourth sidewall 18 are positioned upright such that they run substantially parallel to one another and are adjoined to each of the first sidewall 12 and second sidewall 14 about either of the lateral ends, thus forming an enclosure.

When arranged according to this configuration, the first sidewall 12 is joined about either of its lateral ends to each of the lateral ends of the third sidewall 16 and fourth sidewall 18, respectively. Similarly, the second sidewall 14 is joined about either of its lateral ends to each of the opposing lateral ends of the third sidewall 16 and fourth sidewall 18 to which the first sidewall 12 is not adjoined. The third sidewall 16 is joined about either of its lateral ends to each of the lateral ends of the first sidewall 12 and second sidewall 14, respectively. Similarly, the fourth sidewall 18 is joined about either of its lateral ends to each of the opposing lateral ends of the first sidewall 12 and second sidewall 14 to which the third sidewall 16 is not adjoined. A covering grate 20 may be placed atop the enclosure created by the four sidewalls (12, 14, 16, and 18).

Each of the various sidewalls 12, 14, 16, and 18 may have a series of receiving holes placed about the relative center of their width, spaced apart vertically, which are capable of receiving a bolt or screw. As shown in FIG. 2, the first sidewall 12 has a first receiving hole 100 and a second receiving hole 102. Each of receiving holes 100 and 102 are positioned approximately equidistant from either of the lateral ends of the first sidewall 12 at a relative vertical height which approximately corresponds to the position of the respective securement tabs (22, 24, 26, and 28). Each of the remaining three sidewalls 14, 16, and 18 may be fitted with similarly sized and spaced receiving holes such that when the various sidewalls are stacked on top of one another according to the disassembled configuration, the receiving holes of the various sidewalls align with one another, as shown in FIG. 1.

When the folding fire pit design is disassembled, as shown in FIG. 1, the various components of the fire pit design may be collapsed about, or stacked on top of, one another so as to more easily transport and/or store the unit. According to the embodiment shown in FIG. 1, any combination of the various five sides, including the four sidewalls and covering grate 20, may be stacked about one another. As shown in FIG. 1, the third and fourth sidewalls, 16 and 18, are placed about opposite ends of one another, with the various other components placed therebetween. A carrying unit, such as the handle fixture 80 shown in FIG. 1, may be used to easily transport the folding fire pit design when in the disassembled configuration.

With continued reference to FIG. 1, a series of bolts 90 and 92 may be inserted through that of the respective receiving holes of the various components so as to secure the components as a single, transportable unit. The bolts 90 and 92 may further be accompanied by a wing nut or other similar fastening component so as to better secure the various components to one another. The bolts 90 and 92 may be inserted through the various receiving holes which are present on each of the respective faces of the sidewalls 12, 14, 16, and 18, as well as through the various openings in covering grate 20. When secured by way of the bolts 90 and 92, the folding fire pit design may be easily transported and stored as a single, secured unit, such as by way of the handle fixture 80 located on the third sidewall 16.

Each of the first and second sidewalls 12 and 14 may have at least one additional receiving hole capable of providing the folding fire pit design with an additional means of functionality. According to the embodiment shown in FIG. 2, the first sidewall has an additional receiving hole, utility hole 110, which may be placed about the relative center of the width of the first sidewall 12. A corresponding second utility hole may be present about the same relative position on that of the second sidewall 14 such that when the folding fire pit design is in the assembled configuration, the first utility hole 110 and the second utility hole are aligned with one another. According to one example, the first utility hole 110 and second utility hole may receive a device, such as a rotisserie post or other rotatable device, which is inserted through the center of each utility hole, which may be used for any different number of purposes, such as cooking. Additional variations and uses of the utility hole may be used as necessary.

Each of the various sidewalls may further be equipped with any different number of utility devices. Returning now to FIG. 1, the third sidewall 16 is shown fitted with a utility device, such as bottle opener 120. While such utility devices may be placed at various locations about the surface of the various sidewalls, the example shown in FIG. 1 places the bottle opener 120 in the upper left hand corner of the third sidewall 16. Bottle opener 120 may be generally defined as an extension of the third sidewall 16 which has a generally concave, rigid opening manufactured from the same material as that of the third sidewall 16. The rigid concave opening of bottle opener 120 is thus capable of grasping and releasing a bottle cap used to seal any different variety of beverages.

The means of securing the various sidewalls to one another may be according to any different number of methods which are capable of creating a secured and stable attachment between the various components. According to the embodiment shown in FIG. 2, a series of securement tabs and corresponding receiving slots may be used. The exact number of securement tabs and corresponding receiving slots may vary according to the dimensions of the folding fire pit design.

By way of one example, as shown in FIG. 2, the first sidewall 12 is fitted with a series of four securement tabs: a first securement tab 22, a second securement tab 24, a third securement tab 26, and a fourth securement tab 28. Each of the four securement tabs are manufactured from the same material as that of the first sidewall 12 and extend away from the outer lateral edges of the first sidewall 12. The four securement tabs are of a generally rectangular nature and extend away from the first sidewall 12 in such a manner so as to create a notch therebetween. The notch is created by the securement tab first extending directly outward from the outer lateral edge of the first sidewall 12 at an angle which is substantially perpendicular thereto, followed by an approximate 90 degree bend in which the securement tab then extends back towards the bottommost edge of the folding fire pit. Each of the four securement tabs are placed approximately in each of the respective four corners of the first sidewall 12.

Figure 3:
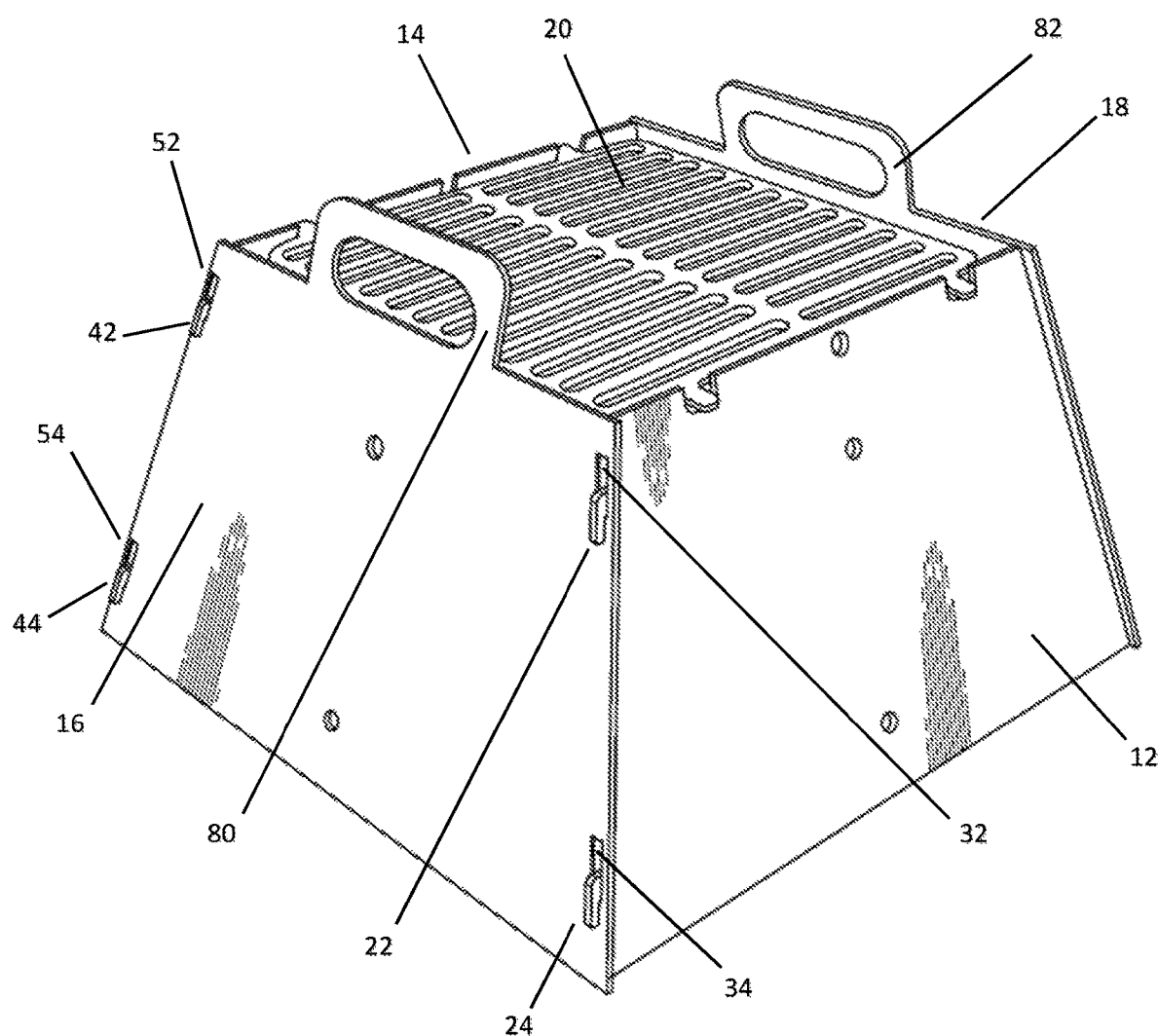
FIG. 3 is a perspective view of the folding fire pit design in the assembled configuration.

The second sidewall 14 comprises substantially the same features as that of the first sidewall 12 and is a substantially similar component situated such that it directly opposes the first sidewall of the folding fire pit. Thus, the second sidewall 14 will comprise a series of four securement tabs which are able to be inserted into corresponding receiving slots on each of the third and fourth sidewalls, 16 and 18. With reference now to FIG. 3, two of the securement tabs of the second sidewall 14 are seen: a fifth securement tab 42 and a sixth securement tab 44. Located about the opposing lateral end of the second sidewall 14, while not visible in FIG. 3, are two additional securement tabs, placed in a similar configuration to that of the first sidewall 12 (about the remaining two corners of the second sidewall 14).

With continued reference to FIG. 3, the third sidewall 16 is fitted with a series of receiving slots: a first receiving slot 32, a second receiving slot 34, a third receiving slot 52, and a fourth receiving slot 54. Each of the four receiving slots are capable of receiving a securement tab so as to create a secured and stable attachment between two sidewalls. Each of the four receiving slots are generally defined as a cutaway portion from that of the third sidewall 16 such than an opening, or slot, is created. The dimensions of the respective receiving slots are slightly larger than that of the width of the securement tabs present on each of the first and second sidewalls, 12 and 14, respectively, such that the securement tabs are capable of being inserted through that of the receiving slots. Each of the four receiving slots are placed approximately in each of the respective four corners of the third sidewall 16 so as to correspond with the relative placement of the securement tabs on each of the first and second sidewalls, 12 and 14. Upon a particular securement tab being inserted into that of a corresponding receiving slot, a secured attachment is achieved upon the notch of the securement tab being able to rest upon that of the corresponding receiving slot.

The fourth sidewall 18 comprises substantially the same features as that of the third sidewall 16 and is a substantially similar component situated about an opposing side of the folding fire pit. Thus, the fourth sidewall 18 comprises a series of four receiving slots which are capable of receiving a corresponding securement tabs from each of the first and second sidewalls, 12 and 14.

With respect to the four securement tabs of the first sidewall 12, two of the corresponding receiving slots are located on the third sidewall 16 and two of the receiving slots are located on the fourth sidewall 18. With continued reference to FIG. 3, receiving slots 32 and 34 are shown receiving their respective securement tabs 22 and 24. Located about the opposing lateral end of the third sidewall 16, receiving slots 52 and 54 are shown receiving their respective securement tabs 42 and 44. The third sidewall 16 is thus securely affixed to each of the first and second sidewalls 12 and 14. The fourth sidewall 18 is similarly adjoined to each of the first and second sidewalls 12 and 14 according to the relation between the remaining securement tabs and corresponding receiving slots so as to create an enclosure in which a fire may be housed. Referring back now to FIG. 2, securement tabs 26 and 28 would thus be inserted into their corresponding receiving slots located on the fourth sidewall 18 so as to create the secured attachment between the first sidewall 12 and the fourth sidewall 18.

While the attachment between any of the respective securement tabs and corresponding receiving slots is secure, the ability to remove the respective securement tabs from their corresponding receiving slot can be done with relative ease and simplicity. As the notch of each securement tab rests upon that of the opening of the corresponding receiving slot, and is not accompanied by any additional locking device or other related mechanism, the securement tab can be removed by the application of a sufficient amount of force to free the securement tab from that of the corresponding receiving slot. While the amount of force necessary to free a securement tab from that of the corresponding receiving slot will vary according to certain variables, such as the specific material of construction of the various sidewalls or the exact dimensions of the respective securement tabs and receiving slots, such an amount does not exceed that which is capable of being exerted by the average individual who wishes to independently assemble or disassemble the folding fire pit design.

Returning now to FIG. 2, the covering grate 20 is shown placed atop the enclosure created by the four sidewalls (12, 14, 16, and 18). According to various embodiments of the folding fire pit design, the covering grate 20 is removably affixed to the outer edges of each of the four sidewalls. The covering grate 20 may be manufactured of a similar fireproof material as that of the four sidewalls, as discussed previously.

What principally distinguishes the covering grate 20 from that of the various four sidewalls is the slotted, open nature of the design. The covering grate 20 features a number of openings extending across the width thereof so as to allow air to penetrate directly through, and escape from, the folding fire pit. The exact dimensions of the covering grate 20 may vary according to the dimensions of the various other components of the folding fire pit design, such as size of the various sidewalls, which thereby dictate the relative size of the opening created at the top of the enclosure encased by the four sidewalls.

The covering grate 20 may utilize any different number of designs or grating patterns. According to one embodiment, the grate is a single unit which spans substantially the entire opening between the four sidewalls and contains a series of similarly spaced openings which run horizontally across the width of the folding fire pit when viewed from the frontal perspective facing the first sidewall 12. According to the embodiment shown in FIG. 2, the covering grate 20 consists of a single unit with similarly spaced openings running horizontally across the width of the folding fire pit design when viewed form the frontal perspective facing the first sidewall 12, separated approximately down the middle by a single solid strip of material. This configuration effectively splits the covering grate 20 into two portions: a left grate 20A and a right grate 20B. While still constituting a single component, this design allows for greater customization in the use of the fire pit for any different number of purposes. For example, the covering grate 20 may be used as a cooking grate for preparing food when the folding fire pit design is configured according to the assembled configuration.

According to the example shown in FIG. 2, the separation of the covering grate 20 into two distinct portions, left grate 20A and right grate 20B, allows for greater versatility with regards to food preparation. When utilizing the covering grate 20 as a cooking grate, the covering grate 20 may be manufactured from any material which is known by those having skill in the art as being suitable for such cooking grate designs and thus does not have any harmful effects when used for such food preparation purposes.

With continued reference to FIG. 2, the covering grate 20 may be affixed to the various outer edges of the four sidewalls so as to create a more secured connection. According to the embodiment shown in FIG. 2, a series of four securement tabs extend outwardly from the covering grate 20: a first covering grate securement tab 62, a second covering grate securement tab 64, a third covering grate securement tab 66, and a fourth covering grate securement tab 68. The shape of the covering grate securement tabs shown in the embodiment of FIG. 2 are generally flat, rounded about the ends, and extend beyond that of the overall length of the last opening of the covering grate 20; however, various other shapes and lengths of the covering grate securement tabs may also be used.

Each of the covering grate securement tabs may be inserted into a corresponding receiving opening present on the outer edge of the various four sidewalls upon which the covering grate 20 rests. According to the embodiment shown in FIG. 2, two receiving openings are present upon the outer edge of the first sidewall 12, receiving openings 72 and 74, and an additional two receiving openings are present upon the outer edge of the second sidewall 14, receiving openings 76 and 78. Each of these respective receiving openings is of a generally round nature and may be further defined as a cutaway portion from the outer edge of the respective sidewall traveling towards that of the bottommost edge of the folding fire pit design. When the covering grate 20 is positioned upon the outer edges of the various sidewalls, covering grate securement tab 62 may be inserted into that of receiving opening 72, covering grate securement tab 64 inserted into that of receiving opening 74, covering grate securement tab 66 inserted into that of receiving opening 76, and covering grate securement tab 68 inserted into that of receiving opening 78 so as to securely position the covering grate 20 in place.

A handle fixture may be affixed to the outer edge of the various sidewalls in order to provide for easier transportation of the folding fire pit design. Returning now to FIG. 3, the third sidewall 16 is fitted with a first handle fixture 80, while the fourth sidewall 18 is fitted with a second handle fixture 82. Either of the handle fixtures may be an external component which is affixed to that of the various sidewalls, or may be an extension of the sidewall itself, manufactured from the same material as that of the sidewalls. According to the embodiment shown in FIG. 3, both the first and second handle fixtures 80 and 82 are an extension of the third and fourth sidewalls, 16 and 18, respectively.

While the embodiments described in FIGS. 1, 2, and 3 place the receiving openings for which the covering grate securement tabs may be inserted on that of the first and second sidewalls, 12 and 14, and the handle fixtures 80 and 82 on that of the third and fourth sidewalls, 16 and 18, various other designs and embodiments are contemplated by the present invention. For example, another embodiment may place the receiving openings for which the covering grate securement tabs may be inserted on that of the third and fourth sidewalls, 16 and 18, while placing the handle fixtures 80 and 82 on that of the first and second sidewalls, 12 and 14.

As described above, the present disclosure has been described in association with various aspects thereof and it is understood that many changes and modifications to the described aspects can be carried out without departing from the scope and the spirit of the present disclosure that is intended to be limited only by the appended claims.

Having thus described the invention, it is now claimed:

1. A folding fire pit design comprising:
    a first sidewall;
    a second sidewall, wherein said second sidewall is positioned such that it directly opposes said first sidewall;
    a third sidewall, wherein said third sidewall is positioned adjacent to both said first and second sidewalls;
    a fourth sidewall, wherein said fourth sidewall is positioned adjacent to both said first and second sidewalls and is positioned such that it directly opposes said third sidewall;
    and a covering grate;
    wherein said first, second, third, and fourth sidewalls have a collapsible relation to one another and said covering grate is capable of being interchangeably removed so as to create an enclosure between said first, second, third, and fourth sidewalls;
    wherein said first, second, third, and fourth sidewalls and the covering grate each further comprise at least one receiving hole that cooperates with at least one bolt such that when the respective sidewalls and covering grate are stacked on top of one another in a disassembled configuration, the receiving holes of the respective sidewalls and covering grate align with one another so that the at least one bolt is inserted through the respective aligned receiving holes to secure the sidewalls and covering grate in the dissembled configuration as a single transportable unit.

2. The folding fire pit design of claim 1, wherein said first sidewall further comprises at least one securement tab extending from the outer perimeter of either lateral end, at least one receiving opening capable of receiving a corresponding associated securement tab located about the outer perimeter of the topmost edge, and wherein the at least one receiving hole is positioned equidistant from either of the lateral ends of said first sidewall.

3. The folding fire pit design of claim 2, wherein said second sidewall further comprises at least one securement tab extending from the outer perimeter of either lateral end, at least one receiving opening capable of receiving a corresponding associated securement tab located about the outer perimeter of the topmost edge, and wherein the at least one receiving hole is positioned equidistant from either of the lateral ends of said second sidewall.

4. The folding fire pit design of claim 3, wherein said third sidewall further comprises at least one receiving slot located about the outer perimeter of either lateral end capable of receiving a corresponding securement tab from either of said first or second sidewalls.

5. The folding fire pit design of claim 4, wherein said fourth sidewall further comprises at least one receiving slot located about the outer perimeter of either lateral end capable of receiving a corresponding securementtab from either of said first or second sidewalls.

6. The folding fire pit design of claim 5, wherein said third and fourth sidewalls further comprise a handle fixture located about the outer perimeter of the topmost edge to enable transport of the stacked sidewalls and covering grate when in the disassembled configuration.

7. The folding fire pit design of claim 6, wherein said covering grate further comprises at least one associated securement tab extending from the outer perimeter of either lateral end such that said at least one associated securement tab is capable of being removably inserted into said receiving openings of said first and second sidewalls.

8. The folding fire pit design of claim 7, wherein the covering grate is a cooking grate.

9. The folding fire pit design of claim 8, wherein the sidewalls and covering grate each further comprise at least one additional receiving hole such that the additional receiving holes of the respective sidewalls align with one another so that at least one additional bolt is inserted through the respective aligned additional receiving holes to further secure the sidewalk and the covering grate as the single, transportable unit.

10. The folding fire pit design of claim 9, wherein the third sidewall further comprises a utility device.

11. A method of constructing a folding fire pit design comprising the steps of:
 a. providing a first, second, third, and fourth sidewalk each having a collapsible relation to one another, and a covering grate capable of being placed about the topmost edge of each of said sidewalls;
 b. erecting said first sidewall;
 c. positioning said second sidewall such that it directly opposes said first sidewall;
 d. positioning said third sidewall adjacent to both said first and second sidewalls;
 e. positioning said fourth sidewall adjacent to both said first and second sidewalls and such that it directly opposes said third sidewall;
 f. positioning said covering grate so as to create an enclosure between said first, second, third, and fourth sidewalls;
 g. disassembling the enclosure between the first, second, third, and fourth sidewalls and covering grate;
 h. stacking the sidewalls and the covering grate:
 i. aligning receiving holes formed onto each of the sidewalls and the covering grate;
 j. inserting a bolt through the respective aligned receiving holes; and
 k. securing the sidewalk and covering grate in a dissembled configuration as a single, transportable unit.

12. The method of constructing a folding fire pit design of claim 11, wherein said first sidewall further comprises at least one securement tab extending from the ou e perimeter of either lateral end, at least one receiving opening capable of receiving a corresponding associated securement tab located about the topmost edge, and wherein the at least one receiving hole is positioned equidistant from either of the lateral ends of said first sidewall.

13. The method of constructing a folding fire pit design of claim 12, wherein said second sidewall further comprises at least one securement tab extending from the outer perimeter of either lateral end, at least one receiving opening capable of receiving a corresponding associated securement tab located about the outer perimeter of the topmost edge, and wherein the at least one receiving hole is positioned equidistant from either of the lateral ends of said second sidewall.

14. The method of constructing a folding fire pit design of claim 13, wherein said third sidewall further comprises at least one receiving slot located about the outer perimeter of either lateral end capable of receiving a corresponding securement tab from either of said first or second sidewalls.

15. The method of constructing a folding fire pit design of claim 14, wherein said fourth sidewall further comprises at least one receiving slot located about the outer perimeter of either lateral end capable of receiving a corresponding securement tab from either of said first or second sidewalls.

16. The method of constructing a folding fire pit design of claim 15, wherein said third and fourth sidewalls further comprise a handle fixture located about the topmost edge to enable transport of the stacked sidewalls and covering grate when in the disassembled configuration.

17. The method of constructing a folding fire pit design of claim 16, wherein said covering grate further comprises at least one associated securement tab extending from the outer perimeter of either lateral end.

18. The method of constructing a folding fire pit design of claim 17, further comprising the step of inserting the securement tabs of said first and second sidewalls into the receiving slots of said third and fourth sidewalls.

19. The method of constructing a folding fire pit design of claim 18, further comprising the step of inserting the associated securement tabs of said covering grate into the receiving openings of said first and second sidewalls.

20. A folding fire pit design comprising:
 a first sidewall, wherein said first sidewall has at least one securement tab extending from the outer perimeter of either lateral end, at least one receiving opening capable of receiving a corresponding associated securement tab located about the outer perimeter of the topmost edge, and at least one receiving hole positioned equidistant from either of the lateral ends of said first sidewall;
 a second sidewall, wherein said second sidewall has at least one securement tab extending from the outer perimeter of either lateral end, at least one receiving opening capable of receiving a corresponding associated securement tab located about the outer perimeter of the topmost edge, at least one receiving hole positioned equidistant from either of the lateral ends of said second sidewall, and is positioned such that it directly opposes said first sidewall;
 a third sidewall, wherein said third sidewall has at least one receiving slot located about the outer perimeter of either lateral end capable of receiving a corresponding securement tab from either of said first or second sidewalk, a handle fixture located about the outer perimeter of the topmost edge, and is further positioned adjacent to both said first and second sidewalls;
 a fourth sidewall, wherein said fourth sidewall has at least one receiving slot located about the outer perimeter of either lateral end capable of receiving a corresponding securement tab from either of said first or second sidewalls, a handle fixture located about the outer perimeter of the topmost edge, is positioned adjacent to both said first and second sidewalls, and is positioned such that it directly opposes said third sidewall;
 and a covering grate having at least one associated securement tab extending from the outer perimeter of either lateral end, wherein said at least one associated securement tab extending from either lateral end of said covering grate is capable of being removably inserted into said receiving opening of said first and second sidewalls so as to create an enclosure between said first, second, third, and fourth sidewalls;
 wherein said first, second, third, and fourth sidewalls have a collapsible relation to one another and said securement tabs of said first and second sidewalls are inserted into said corresponding receiving slots of said third and fourth sidewalls and said associated securement tabs of said covering grate are inserted into said corresponding receiving openings of said first and second sidewalls.

* * * * *